(12) United States Patent
Koyama et al.

(10) Patent No.: US 7,166,338 B2
(45) Date of Patent: Jan. 23, 2007

(54) OPTICALLY SEMI-TRANSMISSION REFLECTION MATERIAL

(75) Inventors: Hiroshi Koyama, Kamisu-machi (JP); Tomotsugu Takahashi, Chiyoda-ku (JP)

(73) Assignee: Yupo Corporation, Tokyo (JP)

( * ) Notice: Subject to any disclaimer, the term of this patent is extended or adjusted under 35 U.S.C. 154(b) by 822 days.

(21) Appl. No.: 10/028,361

(22) Filed: Dec. 28, 2001

(65) Prior Publication Data

US 2002/0122146 A1 Sep. 5, 2002

(30) Foreign Application Priority Data

Dec. 28, 2000 (JP) .............................. 2000-400855

(51) Int. Cl.
*G02F 1/1335* (2006.01)

(52) U.S. Cl. .................. 428/1.1; 349/114; 428/1.3; 428/1.6; 428/323; 428/324; 428/325; 428/327

(58) Field of Classification Search .............. 428/1.1, 428/1.3, 1.6, 323, 324, 325, 327; 349/114
See application file for complete search history.

(56) References Cited

U.S. PATENT DOCUMENTS 5,680,720 A * 10/1997 Asazuma et al. ............. 40/564

6,030,756 A * 2/2000 Bourdelais et al. ......... 430/363

FOREIGN PATENT DOCUMENTS

| EP | 0 630 759 A1 | 12/1994 |
| EP | 0 724 181 A2 | 7/1996 |
| EP | 0 810 086 A2 | 12/1997 |
| EP | 1 116 745 A1 | 7/2001 |
| EP | 1 122 704 A1 | 8/2001 |

OTHER PUBLICATIONS

Patent Abstracts of Japan, JP 01-156062, Jun. 19, 1989.

* cited by examiner

*Primary Examiner*—Nasser Ahmad
(74) *Attorney, Agent, or Firm*—Oblon, Spivak, McClelland, Maier & Neustadt, P.C.

(57) ABSTRACT

An optically semi-transmission reflection material comprises a resinous film comprising a thermoplastic resin, wherein the sum of total light ray transmittance, T %, and total light ray reflectance, R %, i.e., T+R, is 80 to 100%; an absolute value of their difference is $|(T-R)|<50\%$ when displayed value a and displayed value b in transmitted light are designated as $a_T$ and $b_T$, respectively, and when in reflected light, displayed value b is designated as $b_r$, in the transmitted light, $a_T$ and $b_T$ are in the range of $-2 \leq a_T \leq 2$, and $-2 \leq b_T \leq 1.3$ and the difference between the displayed value b to the transmitted light and the reflected light is $|(b_T - b_r)| < 10$.

22 Claims, 1 Drawing Sheet

OPTICALLY SEMI-TRANSMISSION REFLECTION MATERIAL

FIELD OF THE INVENTION

The present invention relates to an optically semi-transmission reflection material. More speciifically, it relates to an optically semi-transmission reflection material capable of achieving a high luminance by transmitting light emanating from a light source located in the back surface direction and reflecting light emanating from a light source located in the front direction.

DESCRIPTION OF THE RELATED ART

A liquid crystal display apparatus is known wherein in a dark place, a built-in light source is lighted and a displayed image is visually recognized with transmitted light, while, in a bright place, the built-in light source is turned off and a displayed image is visually recognized by reflecting light from outside. A typical construction is as shown in FIG. 1. Particularly, noting the back surface to a liquid crystal cell reveals that characteristically on the back surface of the liquid crystal cell are laminated a polarized plate and an optically semi-transmission reflection material in order.

In such a liquid crystal unit, an optically semi-transmission reflection material functions for effectively utilizing light for displaying from a built-in light source in a dark place or light from an external light source, and also for realizing a display meeting various purposes. Generally, transmitted light or reflected light, which is glaring, is disliked. The optically semi-transmission reflection material is required to give a natural impression i.e., a display appearing similarly with either transmitted light or reflected light. That is, the display given by transmitted light and that by reflected light are required to be balanced in their impression.

Conventionally, as an optically semi-transmission reflection material, there has been used one wherein a coating layer comprising fillers such as a pearl pigment, a silica and alumina is provided on a base film of which transparency or non-transparency has been regulated so that total light ray transmittance and total light ray reflectance may be controlled. It has also been known that the fillers as described above are added into a laminating adhesive for adhering a polarized flim with an optically semi-transmission reflection material to adhere the same, whereby total light ray transmittance and total light ray reflectance are controlled.

In such a conventionally known optically semi-transmission reflection material, even if the brightness to transmitted light and that of reflected light are balanced, the color displayed with the transmitted light and that of the reflected light are seen differently so that an unnatural impression is given.

BRIEF DESCRIPTION OF THE DRAWINGS

In FIGS. 1 and 2 the following elements are identitied:
1. optically semi-transmission reflection material
2. polarized plate
3. liquid crystal cell
4. external light
5. built-in light source A. surface-protecting layer (A)
B. base layer (B)
C. back surface-protecting layer (C)

SUMMARY OF THE INVENTION

Figure 1:
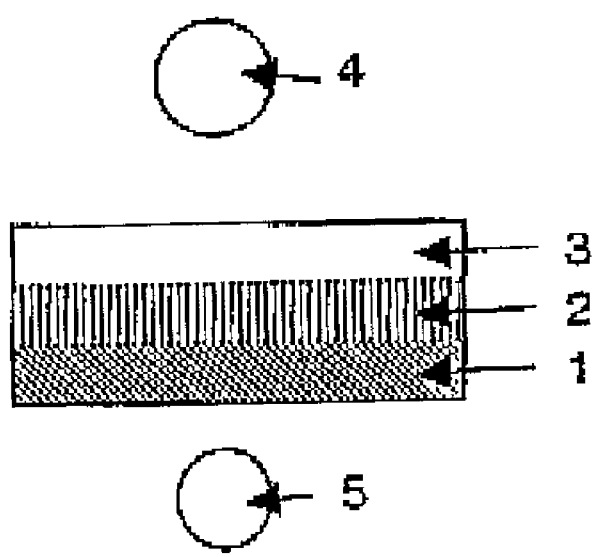
FIG. 1 describes a schematic sectional view of a liquid crystal display apparatus.

An object of the present invention is to provide an optically semi-transmission reflection plate which balances brightness with transmitted light and that with reflected light, and gives a displayed color with transmitted light and that with reflected light, which are seen similarly, so that a natural impression is provided.

The present inventors have conducted extensive study and research efforts in order to realize balanced brightness and displayed color obtained with transmitted light and reflected light. As the result, it was found that such object could be achieved by controlling optical properties of an optically semi-transmission reflection material within a certain range.

The present inventors, in order to realize balanced brightness and displayed color obtained with transmitted light and reflected light, have constructed an article comprising base layer (B) to which an optically semi-transmission reflection property has been imparted and surface-protecting layer (A) for protecting the properties of base layer (B). A back surface protecting layer C may be provided as an optional layer.

The inventors consider it preferable to impart an optically semi-transmission reflection property and a property for providing nerve to base layer (B), and that it is also preferable for surface-protecting layer (A) to have a structure and function of protecting base layer (B). It is further preferred that in view of productivity, base layer (B) and surface-protecting layer (A) be molded by orienting in a biaxial direction. It is still further preferred that according to such a construction, a displayed color with transmitted light and that with reflected light not differ remarkably or markedly with each other in order to give a natural impression.

Thus, in accordance with the present invention, there is provided an optically semi-transmission reflection material comprising a resinous film, the resinous film comprising a thermoplastic resin, wherein the sum of total light ray transmittance, T %, and total light ray reflectance, R %, i.e., T+R, is 80 to 100% (T % and R % of the resinous film are mean values of the transmittance and the reflectance determined at a wavelength within range of 380 nm to 780 nm according to JIS-Z8701); an absolute value of their difference is $|(T-R)|<50\%$; when displayed value a and displayed value b in transmitted light are designated as $a_T$ and $b_T$, respectively, and when in reflected light, displayed value b is designated as $b_r$, in the transmitted light, $a_T$ and $b_T$ are in the range of $-2 \leq a_T \leq 2$, and $-2 \leq b_T \leq 1.3$ and the difference between the displayed value b of the transmitted light and the reflected light is $|(b_T-b_r)|<10$.

The total light ray transmittance of the optically semi-transmission reflection material, T is desirably 20 to 60%.

The resinous film preferably comprises a multi-layered resinous oriented film obtained by laminating at least two layers of surface-protecting layer (A) and base layer (B), then orienting the resulting laminated product, where the preferred orientation is biaxial orientation. Surface-protecting layer (A) preferably has a film thickness of is 0.1 µm or more.

In the multi-layered resinous oriented film, a ratio of a longitudinal direction orientation magnification (MD: machine direction), $L_{MD}$ to a lateral direction orientation magnification (CD; cross direction), $L_{CD}$, $L_{MD}/L_{CD}$, is desirably 0.2 to 3. An area orientation magnification of the multi-layered resinous oriented film ($L_{MD} \times L_{CD}$) is desirably 4 to 80-fold. It is desirable that surface-protecting layer (A) has a void content of 1 to 70%, and base layer (B) or a back surface-protecting layer (C) has a void content of 3 to 15%.

The multi-layered resinous oriented film preferably comprises an inorganic fine powder and/or an organic filler. The thermoplastic resin preferably comprises a polyolefin-based resin or a polyester resin. The polyolefin-based resin included in surface-protecting layer (A) preferably comprises a propylene-based resin having a melting point of 140° C. or more. The inorganic fine powder and/or the organic filler included in surface-protecting layer (A) is desirably 1 to 50% by weight based on total weight and the inorganic fine powder and/or the organic filler included in base layer (B) is desirably 1 to 30% by weight based on total weight. An average particle diameter of the inorganic fine powder is desirably 0.1 to 5 μm, and an average dispersed particle diameter of the organic filler is desirably 0.1 to 5 μm.

Further in accordance with the present invention, there is also provided a liquid crystal display apparatus using the above-described optically semi-transmission reflection material.

DESCRIPTION OF THE PREFERRED EMBODIMENTS

The construction and effects of the optically semi-transmission reflection material according to the present invention will be described in detail below.

Optical Properties

The optically semi-transmission reflection material of the present invention is characterized in that the total light ray transmittance, T %, and the total light ray reflectance, R % determined according to the description in JIS-Z8701, incorporated herein by reference, are balanced in such a range that both T % and R % has a high values. As an index where both the total light ray transmittance, T, and the total light ray reflectance, R, have a high value, the sum of T+R is 80 to 100%, preferably 85 to 90%, and more preferably 90 to 100%. In a case where (T+R) is less than 80%, sufficient reflectance and transmittance cannot be obtained. Therefore, a displayed picture in a bright place and a dark place is dark so that the visual recognition property of letters is decreased.

An index of a balance between the total light ray transmittance, T, and the total light ray reflectance, R, is the absolute value of their difference, which preferably is |(T−R)|<50%, more preferably |(T−R)|<30%. When |(T−R)| is 50% or more, in case of T>R, the visual recognition property of letters in a bright place is noticeably decreased, and contrary to this, in the case of T<R, visual recognition property of letters in a dark place is noticeably decreased.

The total light ray transmittance, T, is preferably 20 to 60%, more preferably 30 to 55%, highly preferably 40 to 50%, and most preferably 45 to 50%. In the case where the total light ray transmittance, T, is less than 20%, light transmittance is insufficient. While, when it exceeds 60%, light reflectance is insufficient.

The optically semi-transmission reflection material of the present invention is characterized in that respective displayed colors are not remarkably varied in transmitted light and reflected light and are well-balanced. According to the method described in JIS-Z8701, incorporated herein by reference, three irritation values X, Y and Z in reflected light and transmitted light in C light source 2° field of view are calculated, and display value a, and display value b are calculated according to the following formula, $$a=17.5 \times (1.02 \times X-Y)/Y^{(1/2)}$$

$$b=7.0 \times (Y-0.847=Z)/Y^{(1/2)}$$

In the present invention, display value a and display value b in transmitted light are designated as $a_T$ and $b_T$, respectively, and display value b in reflected light is designated as $b_r$. As indexes of a balance of displayed colors with transmitted light and reflected light, preferably $a_T \leq 2$, more preferably $-2 \leq a_T \leq 2$, highly preferably $-1 \leq a_T \leq 1$, and especially preferably $-0.5 \leq a_T \leq 0.5$. While, preferably $b_T \leq 1.3$, more preferably $-2 \leq b_T \leq 1.3$, and most preferably $-1 \leq b_T \leq 1$. Further, preferably $|(b_T-b_r)|<10$, more preferably $|(b_T-b_r)|<8$, and most preferably $|(b_T-b_r)|<3$.

In the case where these display values are outside the above-described range, a balance between respective displayed colors with transmitted light and reflected light may have a problem. For example, in case of $a_T>2$, a displayed color under transmitted light is liable to be strong in red color, on the other hand, a displayed color under reflected light is liable to be strong in green color. While, in case of $b_T>1.3$, a displayed color under transmitted light is liable to be strong in yellow color, on the other hand, a displayed color under reflected light is liable to be strong in blue color. Further, in case of $|(b_T-b_r)| \geq 10$, for example, when a displayed color under transmitted light is strong in yellow color, a displayed color under reflected light is strong in blue color. Contrary to this, when a displayed color under transmitted light is strong in blue color, a displayed color under reflected light is strong in yellow color. Thus, the balance between the displayed colors is liable to be less than highly desirable.

Surface-Protecting Layer (A)

Surface-protecting layer (A) of the present invention comprises a thermoplastic resin, and also can include an inorganic fine powder and/or an organic filler.

Examples of the thermoplastic resin to be used include ethylene-based resins such as linear low-density polyethylene, high-density polyethylene and medium-density polyethylene; polyolefin-based resins such as propylene-based resins, polymethyl-1-pentene and ethylene-cyclic olefin copolymers; polyamide-based resins such as nylon-6, nylon-6, 6, nylon-6, 10 and nylon-6, 12; polyester-based resins such as polyethylene terephthalate and the copolymers thereof, polyethylene naphthalate and aliphatic polyesters; thermoplastic resins such as polycarbonate, atactic polystyrene, syndiotactic polystyrene and polyphenylene sulfide. They can be used in any mixture thereof. Among these resins, the polyolefin-based resins and the polyester-based resins are preferably used. More preferred is the polyolefin-based resins. Of the polyolefin-based resins, the propylene-based resins are especially preferable in view of chemical resistance and cost.

The propylene-based resins include propylene homopolymers, and copolymers of propylene, as a main component, with an α-olefin such as ethylene, 1-butene, 1-hexene, 1-heptene and 4-methyl-1-pentene. The stereoregularity thereof is not particularly limited. Isotactic and syndiotactic propylene-based resins can be used and those showing various degrees of stereoregularity. The copolymer can comprise two, three or four, etc. kinds of components. Further, the copolymer can be a random copolymer or a block copolymer.

Of the propylene-based resins, propylene homopolymers and propylene copolymers having a melting point of 140° C. or more are preferable. In the case where a resin having a melting point less than 140° C. is included in surface-protecting layer (A), in the extrusion molding of the multi-layered resinous oriented film of the present invention, adhesion of a melted sheet to a cooling roll in cooling the melted sheet with the cooling roll may occur. As the result on the surface of a film, scratches or whitening unevenness is formed, which is liable to cause deterioration of optical properties upon light transmitting or light reflecting.

Such a thermoplastic resin is used in an amount of preferably 99 to 50% by weight, more preferably 97 to 55% by weight, based on total weight.

Inorganic Fine Powder

As the inorganic fine powder, examples include calcium carbonate, calcined clay, silica, diatomaceous earth, talc, mica, synthetic mica, cericite, kaolinite, titanium oxide, barium sulfate and alumina. Of these materials, calcium carbonate and barium sulfate are preferable. When titanium oxide is used in an amount of 1% by weight or more, subduing in color undesirably may occur.

As the organic filler, it is preferable to select a resin different from and incompatible with the thermoplastic resin of layer (A). For example, in a case where a thermoplastic resinous film is a polyolefin-based resinous film, as the organic filler. Preferred examples include polyethylene terephthalate, polybutylene terephthalate, polycarbonate, nylon-6, nylon-6, 6, a homopolymer of a cyclic olefin, and a copolymer of a cyclic olefin and ethylene, which have a melting point of 120 to 300° C. or a glass transition temperature of 120 to 280° C. While, in case where a thermoplastic resinous film is a polyester-based resinous film, as the organic filler, mention may be made of polystyrene, polycarbonate, nylon-6, nylon-6, 6, polymethyl-1-pentene, a homopolymer of a cyclic olefin and a copolymer of a cyclic olefin and ethylene, which have a melting point of 120 to 300° C. or a glass transition temperature of 120 to 280° C.

The above-described inorganic fine powder or organic fillers can be used alone or in any mixture thereof. In the case where they are used as a mixture, a mixture of an inorganic fine powder and an organic filler can be used.

The inorganic fine powder and/or organic filler is preferably included in surface-protecting layer (A) in an amount of 1 to 50% by weight, preferably 3 to 45% by weight. When their formulation amount is over 50% by weight, there can occur such a tendency that optically semi-transmission reflection properties of base layer (B) are inhibited, and the surface strength of base layer (B) is decreased. To the contrary, in the case where the formulation amount is less than 1% blocking is liable to occur.

The thickness of surface-protecting layer (A) is preferably 0.1 μm or more, preferably 0.2 to 30 μm, more preferably 0.5 μm to less than 10 μm. When the thickness is less than 0.1 μm, sufficient protection function cannot be exhibited.

Base Layer (B)

Base layer (B) of the present invention is not limited and can comprise a thermoplastic resin, an inorganic fine powder and/or an organic filler.

As the thermoplastic resin, the inorganic fine powder and the organic filler to be used, those used in surface-protecting layer (A) can be used. The thermoplastic resin is preferably used in an amount of 70 to 99% by weight, more preferably 80 to 99% by weight, and most preferably more than 95% by weight to 99% by weight.

An amount of the inorganic fine powder and/or the organic filler included in base layer (B) is preferably 1 to 30% by weight, preferably 1 to 20% by weight, and especially preferably 1 to less than 5% by weight. When the formulation amount of the inorganic fine powder and/or the organic filler is over 30% by weight, there occurs such a tendency that optical transmitting properties of base layer (B) are excessively decreased, and a crease is liable to be formed due to insufficient stiffness. To the contrary, in the case where the formulation amount is less than 1%, reflectance and transmittance are apt to be unbalanced.

The thickness of base layer (B) is preferably 10 to 200 μm, more preferably 20 to 100 μm, and most preferably 30 to 60 μm.

Back Surface-Protecting Layer (C)

The optically semi-transmission reflection material of the present invention comprises a laminated structure having at least two layers of surface-protecting layer (A) and base layer (B). Further, back surface-protecting layer (C) can optionally be provided over the back surface of base layer (B) (i.e., surface opposite to surface-protecting layer (A)). Back surface-protecting layer (C) comprises a thermoplastic resin, and can include an inorganic fine powder and/or an organic filler.

As the thermoplastic resin, the inorganic fine powder and the organic filler to be used, those used in surface-protecting layer (A) can be used. Particularly, a propylene homopolymer, and a propylene copolymer having a melting point of 140° C. or more are preferable. In the case where a resin having a melting point less than 140° C. is included in back surface-protecting layer (C), in the extrusion molding of the multi-layered resinous oriented film of the present invention, adhesion of a melted sheet to a cooling roll in cooling the melted sheet with the cooling roll may occur. As a result, on the surface of the film, scratches or whitening unevenness is formed, which is liable to cause deterioration of optical properties upon light transmitting or light reflecting.

Such a thermoplastic resin is preferably used in an amount of 99 to 50% by weight, more preferably 99 to 55% by weight.

The inorganic fine powder and/or organic filler can be included in back surface-protecting layer (C) in an amount of 1 to 50% by weight, preferably 1 to 45% by weight. When the formulation amount of the filler is over 50% by weight, there occurs such a tendency that optically transmitting is inhibited, and also the surface strength of back surface-protecting layer (C) is liable to be decreased, To the contrary, in case where the formulation amount is less than 1%, blocking is liable to occur.

The thickness of back surface-protecting layer (C) is preferably 0.1 μm or more, preferably 0.2 to 30 μm.

The optically semi-transmission reflection material of the present invention is preferably obtained by laminating surface-protecting layer (A), base layer (B), and back surface-protecting layer (C), and thereafter, orienting the resulting laminated product in biaxial direction.

Additive

In the optically semi-transmission reflection material of the present invention, any one or more of a stabilizer, a light stabilizer, a dispersant and a lubricant can be formulated depending upon necessity. As the stabilizer, included are a steric hindrance phenol-based, phosphorous-based, or amine-based stabilizer in an amount of, e.g., 0.001 to 1% by weight, as the light stabilizer, steric hindrance amine-based, benzotriazole-based, or benzophenone-based stabilizer in an amount of, e.g., 0.001 to 1% by weight, as the dispersant of the inorganic fine powder, included are a silane coupling agent, a higher aliphatic acid such as oleic acid or stearic acid, a metallic soap polyacrylic acid, polymethacrylic acid or the salts thereof in an amount of, e.g., 0.01 to 4% by weight, Molding As a molding method of a formulated product comprising a thermoplastic resin, an inorganic fine powder and/or an organic filler, generally used biaxial orientation method can be employed.

Specifically, mention may be made of a biaxial orientation method comprising after extruding a molten resin in the form of sheet using a single-layered or multi-layered T-die or I-die connected to a screw type extruder, a combination of a longitudinal orientation utilizing a difference among peripheral speeds of roll groups and a lateral orientation using a tenter oven; and a simultaneous biaxial orientation comprising a combination of a tenter oven and a linear motor.

An orientation temperature is preferably 2 to 60° C. lower than a melting point of a thermoplastic resin. In the case where a resin is a propylene homopolymer (melting point 155 to 167° C.), the orientation temperature is preferably 152 to 164° C. While, in the case where a resin is a high-density polyethylene (melting point 121 to 134° C.), the orientation temperature is preferably 110 to 120° C. Further, the orientation speed is preferably 20 to 350 m/min.

In order to control the size of voids forced to be formed in a biaxially oriented film, an area orientation magnification=(longitudinal direction orientation magnification, $L_{MD}$)×(lateral direction orientation magnification, $L_{CD}$) is preferably 4 to 80-fold, more preferably 10 to 70-fold, and most preferably 30 to 60-fold.

In order to control the aspect ratio of voids forced to be formed in a biaxially oriented film, a ratio of a longitudinal direction orientation magnification, $L_{MD}$ to a lateral direction orientation magnification, $L_{CD}$, $L_{MD}/L_{CD}$) is preferably 0.2 to 3, more preferably 0.3 to 1.5.

In the case where the area orientation magnification and $L_{MD}/L_{CD}$ are deviated from these ranges, fine voids having almost a circular shape are liable to be difficult to be obtained.

In order to control the size of voids forced to be formed in a biaxially oriented film, an average particle diameter of an inorganic fine powder (obtained from a specific surface area) or an average dispersed particle diameter of an organic filler each is preferably 0.1 to 5 μm, more preferably 0.2 to 4 μm, In the case where the average particle diameter or the average dispersed particle diameter is more than 5 μm, voids are liable to be nonuniform. Contrary to this, in case where the average particle diameter or the average dispersed particle diameter is less than 0.1 μm, given voids are liable to be unable to be obtained.

An average particle diameter of the inorganic fine powder described here is calculated according to the following calculation formula using a specific surface area determined by a determination apparatus (SS-100 model, produced by Shimazu Seisakusho Co., Ltd.).

Average particle diameter (μm)=6/true specific gravity×specific surface area (True specific gravity means a specific gravity of an inorganic fine powder in such a state that it does not include air)

An average dispersed particle diameter of an organic filler described here is obtained in an observation by an electron microscope of a cross section of the filler. Specifically, after burying a multi-layered resinous oriented film with an epoxy resin to solidify the film, for example, a cut area parallel to a thickness direction of a film and perpendicular to a lubricating surface direction of the film is prepared using a microtome, then the cut surface is metallized. The resulting product is scaled up at an optional magnification at which observation by an electron microscope can be readily effected, for example a factor of 500 to 2000.

In order to form preferable voids, it is effective to use an inorganic fine powder which comprises a particle of an inorganic fine powder having a specific surface area of 11000 cm²/g or more and does not comprise a particle diameter of 15 μm or more (determined by a laser diffraction type particle measuring apparatus (microtrack)). Particularly, it is preferable to use calcium carbonate satisfying such condition and having a sharp particle diameter distribution.

When a void size is nonuniform, whitening unevenness is formed, which may deteriorate an appearance of a final product and optical properties thereof.

In order to control the content of voids per unit volume, formed in surface-protecting layer (A), base layer (B) or base layer (B) including back surface-protecting layer (C) of the optically semi-transmission reflection material of the present invention, a void content of surface-protecting layer (A) is preferably in a range of from 1 to 70%, more preferably in a range of from 3 to 65%. While, a void content of base layer (B) or base layer (B) including back surface-protecting layer (C) is preferably in a range of from 3 to 15%, more preferably in a range of from 3 to 12%. When a void content of base layer (B) is over 15%, there occurs such a tendency that optically transmitting property is excessively decreased, and a crease is liable to be formed due to insufficient stiffness. While, in case where the void content is less than 3%, an optical reflecting property is liable to be excessively decreased. In the present invention "void content" means an area proportion of voids in a region of a cross section observed by an electron microscope (%), An area proportion of voids is determined as follows, Specifically, after burying a resinous film with an epoxy resin to solidify the film, for example, is prepared a cut area parallel to a thickness direction of a film and perpendicular to the film surface using a microtome, then the cut surface is metallized. The resulting product is scaled up at an optional magnification at which observation by an electron microscope can be readily effected, for example a factor of 500 to 2000. Successively, the void proportion is traced on a tracing film, and colored. Then, the colored void proportion is subjected to an image treatment by an image analyzer (model Luzex 11D, manufactured by Nireko Co., Ltd.), whereby the area proportion of voids (%) is determined, which is used as a void content.

A density of the resinous film used in the present invention becomes small with increase in an amount of voids, to the contrary, a void content increases with increase in an amount of voids. When a void content is small, optical transmitting properties are improved. Contrary to this, when the void content is large, optical reflecting properties are improved. On the basis of these facts, appropriate ranges of void contents of base layer (B) or base layer (B) including back surface-protecting layer (C), and surface-protecting layer (A) are determined as in the above-description, which is within the skill of the ordinary artisan in view of this disclosure.

EXAMPLES

The present invention will be further described in detail below by way of Examples, Comparative Examples and Test Examples. Materials, their amounts to be used, their proportions, procedures shown below can be changed depending upon necessity as long as such modification are not deviated from the gist of the present invention. Accordingly, the scope of the present invention is not limited to the following specific examples. Raw materials used are shown in Table 1 and respective compositions of each layer are described in Table 2.

Production and Evaluation of Base Material

Examples 1 to 7 and Comparative Example 1

Composition (B) comprising PP2 (described in Table 1), HDPE (described in Table 1) and calcium carbonate (described in Table 1), Compositions (A) and (C) comprising PP1 (described in Table 1), HDPE and calcium carbonate were melted and kneaded at 250° C. using respective different three extruders. Thereafter, respective resulting products were fed to one co-extruding die and laminated inside the die, then extruded in the form of sheet, successively cooled to about 60° C. with a cooling roll. Thus, a laminated product (A/B/C) could be obtained.

After heating this laminated product at 145° C. again, it was oriented in the longitudinal direction utilizing a difference among peripheral speeds of many roll groups at a magnification described in Table 2. Thereafter, the oriented product obtained was heated again to about 150° C. and oriented in the lateral direction using a tenter at a magnification described in Table 2. Thereafter, the resulting product was subjected to an annealing treatment at 160° C. then cooled to 60° C. and the edged portion was slit. Thus, an optically semi-transmission reflection material, i.e., multilayered resinous oriented film, could be obtained.

Example 8

Composition (B) comprising PP2 and calcium carbonate and composition (A) comprising PP1 and calcium carbonate were melted and kneaded at 250° C. using respective different two extruders. Thereafter, respective resulting products were fed to one co-extruding die and laminated inside the die, then extruded in the form of sheet, successively cooled to about 60° C. with a cooling roll. Thus, a two-layered laminated product (A/B) could be obtained.

After heating this laminated product at 145° C. again, it was oriented in the longitudinal orientation utilizing a difference among peripheral speeds of many roll groups at a magnification described in Table 2, then the oriented product was heated again to about 150° C. and oriented in the lateral direction with a tenter at a magnification described in Table 2. Thereafter, the oriented product obtained was subjected to an annealing treatment at 160° C., then cooled to 60° C. and the edged portion was slit. Thus, an optically semi-transmission reflection material, i.e., multilayered resinous oriented film, could be obtained.

It should be noted that Comparative Example 1 was produced according to the method described in Example 1 of Japanese Patent Laid-Open No. 204825/1984.

Regarding the optically semi-transmission reflection materials of Examples 1 to 8 and Comparative Example 1, total light ray transmittance, total light ray reflectance and color tone thereof were determined by effecting tests according to JIS-Z8701 using the determination apparatus (U-3310 manufactured by Hitachi Seisakusho Co., Ltd.)

The "void content" is determined as follows; After burying a multilayered resinous oriented film with an epoxy resin, is prepared a cut area parallel to a thickness direction of a film and perpendicular to the film surface using a microtome, then the cut surface is metallized, The resulting product is scaled up by an electron microscope at a factor of 2000 and the observed region is photographed. Successively, the void proportion is traced on a tracing film and colored. Thereafter, the colored figure is subjected to an image treatment by an image analyzer (model Luzex 11D, manufactured by Nireko Co., Ltd.), whereby the area proportion of voids are determined, which is used as a void content.

Next, a liquid crystal display apparatus having a construction shown in FIG. 1 was produced, and color tone and contrast of the liquid crystal display were evaluated in a dark place having no external lighting in the nighttime through a built-in lamp and in a bright place irradiated with external light (sun light and fluorescent light).

⊚: Color tone and contrast of liquid crystal display are extremely clear.

o: Color tone and contrast of liquid crystal display are clear.

Δ: Color tone and contrast of liquid crystal display are reddish and practically troublesome.

χ: Color tone and contrast of liquid crystal display are entirely blackish and therefore, the display cannot be practically used.

Figure 2:
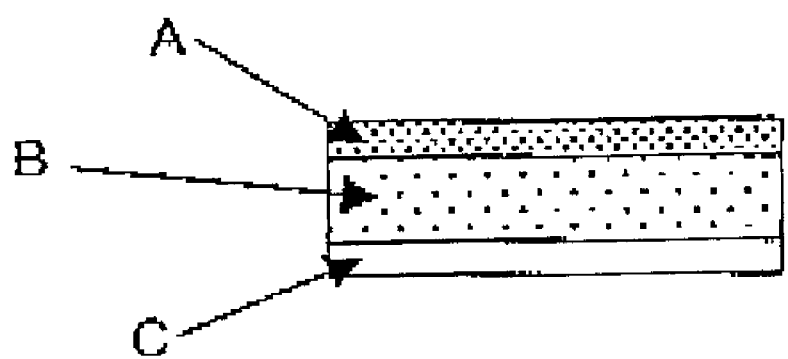
FIG. 2 shows a schematic sectional view of an optically semi-transmission reflection material of the present invention.

The following evaluations were made regarding the formation (whitening unevenness) of the optically semi-transmission reflection material shown in FIG. 2.

⊚: Optically semi-transmission reflection material is entirely translucent and whitening unevenness is not observed.

o: Optically semi-transmission reflection material is entirely translucent and whitening unevenness is not substantially observed.

Δ: Optically semi-transmission reflection material is entirely translucent and whitening unevenness is partially observed, and therefore, the practical used of the product may cause some problems.

χ: Optically semi-transmission reflection material is entirely translucent and whitening unevenness occurs severely, and, therefore, the product cannot be practically used.

The presence or absence of an adhesion of a sheet to a cooling roll was evaluated by examining the presence or absence of the adhesion of the sheet from the die to the cooling roll after melting and kneading.

In Comparative Example 1 comprising a resin having a lower melting point (melting point 134° C.: DSC peak temperature) than that of the propylene homopolymer (melting point 167° C.: DSC peak temperature) which is the matrix resin of surface-protecting layer (A) and back surface-protecting layer (C), a high density polyethylene, an adhesion was observed and whitening unevenness derived from the adhesion was partially observed.

Determination results of Examples and Comparative Example are shown in Tables 2 and 3.

As described hereinabove, according to the optically semi-transmission reflection material of the present invention, displayed color with transmitted light and that with reflected light is seen similarly. Thus, the optically semi-transmission reflection material giving more natural impression than that obtained by the conventional products is achieved.

TABLE 1

| Kind | Content |
| --- | --- |
| PP1 | propylene homopolymer [Nippon Polychem Co., Ltd., Novatech |

TABLE 1-continued

| Kind | Content |
|---|---|
| | PP: EA8] (MFR (230° C., 2.16 kg load) = 0.8 g/10 min.), melting point (167° C., DSC peak temperature) |
| PP2 | propylene homopolymer [Nippon Polychem Co., Ltd., Novatech PP: MA4] (MFR (230° C., 2.16 kg load) = 5 g/10 min.), melting point (167° C., DSC peak temperature) |
| HDPE | high-density polyethylene [Nippon Polychem Co., Ltd., Novatech HD: HJ 360] (MFR (190° C., 2.16 kg load) = 5.5 g/10 min.), melting point (134° C., DSC peak temperature) |
| Calcium carbonate | heavy-duty calcium carbonate having an average particle diameter of 1.8 μm [Bihoku Funka Kogyo (Bihoku pulverization industy) Co., Ltd., Softon 1800 |

Unless specified otherwise, percentages are based on total weight or total volume, as appropriate,

What is claimed is:

1. An optically semi-transmission reflection material comprising a resinous film, said resinous film comprising a thermoplastic resin, wherein the sum of total light ray transmittance, T %, and total light ray reflectance, R %, is 80 to 100%; |(T−R)|<50%; when displayed value a and displayed value b in transmitted light are designated as $a_T$ and $b_T$, respectively, and when in reflected light, displayed value b is designated as $b_r$, in the transmitted light, $a_T$ and $b_T$ are in the range of $-2 \leq a_T \leq 2$, and $-2$ $b_T$ 1.3 and the difference between the displayed value b of the transmitted light and the reflected light is $|(b_T - b_r)| < 10$;

wherein the resinous film comprises a multi-layered resinous oriented film obtained by laminating at least two layers of surface-protecting layer (A) and base layer (B), and optionally back-surface protecting layer (C), then biaxially orienting the resulting laminated product;

TABLE 2

| | Composition of surface-protecting layer (A) (wt %) | | | Composition of base layer (B) (wt %) | | | Composition of back surface-protecting layer (C) (wt %) | | | Layer thickness A/B/C μm | Orientation magnification | | Magnification ratio MD/CD | Area magnification MD * CD | Void content % | |
|---|---|---|---|---|---|---|---|---|---|---|---|---|---|---|---|---|
| | | | | | | | | | | | Longitudinal MD | Lateral CD | | | Surface layer (A) | Base Layer (B) |
| | PP | HDPE | CaCO₃ | PP | HDPE | CaCO₃ | PP | HDPE | CaCO₃ | | | | | | | |
| Ex. 1 | 60 | — | 40 | 91 | 6 | 3 | 97 | — | 3 | 1/48/1 | 4.2 | 8.5 | 0.49 | 35.7 | 45 | 7 |
| Ex. 2 | 70 | — | 30 | 91 | 6 | 3 | 97 | — | 3 | 1/48/1 | 4.2 | 8.5 | 0.49 | 35.7 | 35 | 7 |
| Ex. 3 | 60 | — | 40 | 91 | 6 | 3 | 97 | — | 3 | 3/44/3 | 4.2 | 8.5 | 0.49 | 35.7 | 45 | 7 |
| Ex. 4 | 70 | — | 30 | 82 | 10 | 8 | 97 | — | 3 | 1/48/1 | 4.2 | 8.5 | 0.49 | 35.7 | 35 | 10 |
| Ex. 5 | 60 | — | 40 | 82 | 10 | 8 | 97 | — | 3 | 8/34/8 | 4.2 | 8.5 | 0.49 | 35.7 | 45 | 10 |
| Ex. 6 | 97 | — | 3 | 90 | 6 | 4 | 97 | — | 3 | 1/48/1 | 4.2 | 8.5 | 0.49 | 35.7 | 4 | 8 |
| Ex. 7 | 84 | — | 16 | 90 | 6 | 4 | 97 | — | 3 | 1/48/1 | 4.2 | 8.5 | 0.49 | 35.7 | 20 | 8 |
| Ex. 8 | 70 | — | 30 | 98 | — | 2 | — | — | — | 1/49/0 | 4.2 | 8.5 | 0.49 | 35.7 | 35 | 6 |
| Comp. Ex. 1 | 81 | 3 | 16 | 84 | 16 | — | 81 | 3 | 16 | 10/20/10 | 5 | 5.05 | 0.99 | 25.3 | 33 | 0 |

TABLE 3

| | T % | R % | T + R % | |T − R| % | aT | bT | br | |bT − br| | Image in liquid crystal display apparatus | | Whitening unevenness | Adhesion |
|---|---|---|---|---|---|---|---|---|---|---|---|---|
| | | | | | | | | | dark place | bright place | | |
| Ex. 1 | 45.5 | 51.8 | 97.3 | 6.3 | 0.03 | 0.48 | −1.38 | 1.86 | ◎ | ◎ | ○ | — |
| Ex. 2 | 46.2 | 51.3 | 97.5 | 5.1 | −0.03 | 0.39 | −1.31 | 1.70 | ◎ | ◎ | ○ | — |
| Ex. 3 | 42.1 | 55.7 | 97.8 | 13.6 | −0.02 | 0.40 | −1.36 | 1.76 | ○ | ◎ | ○ | — |
| Ex. 4 | 41.1 | 56.3 | 97.4 | 15.2 | 0.01 | 0.49 | −1.39 | 1.88 | ○ | ◎ | ○ | — |
| Ex. 5 | 40.3 | 56.0 | 96.3 | 15.7 | 0 | 0.48 | −1.35 | 1.83 | ○ | ◎ | ○ | — |
| Ex. 6 | 47.0 | 52.2 | 99.2 | 5.2 | 0.02 | 0.35 | −1.35 | 1.70 | ◎ | ◎ | ◎ | — |
| Ex. 7 | 46.1 | 51.5 | 97.6 | 5.4 | 0.01 | 0.37 | −1.32 | 1.69 | ◎ | ◎ | ○ | — |
| Ex. 8 | 48.0 | 49.2 | 97.2 | 1.2 | −0.01 | 0.44 | −1.36 | 1.80 | ◎ | ◎ | ○ | — |
| Comp. Ex. 1 | 29.7 | 67.8 | 97.9 | 38.3 | 0.15 | 1.56 | −2.1 | 3.63 | △ | △ | △ | + |

This application is based on Japanese patent application JP 2000-400855, filed Dec. 28, 2000, the entire content of which is hereby incorporated by reference, the same as if set forth at length.

wherein in the multi-layered resinous oriented film, a ratio of a longitudinal direction orientation magnification, $L_{MD}$ to a lateral direction orientation magnification, $L_{CD}$, $L_{MD}/L_{CD}$ is 0.2 to 3.

2. The optically semi-transmission reflection material as claimed in claim 1, wherein the total light ray transmittance, T, is 20 to 60%.

3. The optically semi-transmission reflection material as claimed in claim 1, wherein a film thickness of surface-protecting layer (A) is 0.1 μm or more.

4. The optically semi-transmission reflection material as claimed in claim 1, wherein an area orientation magnification of the multi-layered resinous oriented film ($L_{MD} \times L_{CD}$) is 4 to 80-fold.

5. The optically semi-transmission reflection material as claimed in claim 1, wherein the multi-layered resinous oriented film, surface-protecting layer (A) has a void content of 1 to 70% and base layer (B) or back surface-protecting layer (C) has a void content of 3 to 15%.

6. The optically semi-transmission reflection material as claimed in claim 1, wherein the multi-layered resinous oriented film comprises an inorganic fine powder and/or an organic filler.

7. The optically semi-transmission reflection material as claimed in claim 1, wherein the thermoplastic resin comprises a polyolefin-based resin or a polyester resin.

8. The optically semi-transmission reflection material as claimed in claim 7, wherein the polyolefin-based resin included in surface-protecting layer (A) comprises a propylene-based resin having a melting point of 140° C. or more.

9. The optically semi-transmission reflection material as claimed in claim 6, wherein the inorganic fine powder and/or the organic filler included in surface-protecting layer (A) is present in an amount of 1 to 50% by weight, and the inorganic fine powder and/or the organic filler included in base layer (B) is present in an amount of 1 to 30% by weight.

10. The optically semi-transmission reflection material as claimed in claim 6, wherein an average particle diameter of the inorganic fine powder is 0.1 to 5 μm, and an average dispersed particle diameter of the organic filler is 0.1 to 5 μm.

11. A liquid crystal display apparatus, comprising:
an optically semi-transmission reflection material comprising a resinous film, said resinous film comprising a thermoplastic resin, wherein the sum of total light ray transmittance, T %, and total light ray reflectance, R %, is 80 to 100%; |(T−R)|<50%; when displayed value a and displayed value b in transmitted light are designated as $a_T$ and $b_T$, respectively, and when in reflected light, displayed value b is designated as $b_r$, in the transmitted light, $a_T$ and $b_T$ are in the range of $-2 \leq a_T \leq 2$, and $-2 \leq b_T \leq 1.3$ and the difference between the displayed value b of the transmitted light and the reflected light is $|(b_T-b_r)|<10$.

12. The liquid crystal display apparatus as claimed in claim 11, wherein the total light ray transmittance, T, is 20 to 60%.

13. The liquid crystal display apparatus as claimed in claim 12, wherein the resinous film comprises a multi-layered resinous oriented film obtained by laminating at least two layers of surface-protecting layer (A) and base layer (B), and optionally back-surface protecting layer (C), then biaxially orienting the resulting laminated product.

14. The liquid crystal display apparatus as claimed in claim 13, wherein a film thickness of surface-protecting layer (A) is 0.1 μm or more.

15. The liquid crystal display apparatus as claimed in claim 13, wherein in the multi-layered resinous oriented film, a ratio of a longitudinal direction orientation magnification, $L_{MD}$ to a lateral direction orientation magnification, $L_{CD}$, $L_{MD}/L_{CD}$ is 0.2 to 3.

16. The liquid crystal display apparatus as claimed in claim 13, wherein an area orientation magnification of the multi-layered resinous oriented film ($L_{MD} \times L_{CD}$) is 4 to 80-fold.

17. The liquid crystal display apparatus as claimed in claim 13, wherein the multi-layered resinous oriented film, surface-protecting layer (A) has a void content of 1 to 70% and base layer (B) or back surface-protecting layer (C) has a void content of 3 to 15%.

18. The liquid crystal display apparatus as claimed in claim 13, wherein the multi-layered resinous oriented film comprises an inorganic fine powder and/or an organic filler.

19. The liquid crystal display apparatus as claimed in claim 13, wherein the thermoplastic resin comprises a polyolefin-based resin or a polyester resin.

20. The liquid crystal display apparatus as claimed in claim 19, wherein the polyolefin-based resin included in surface-protecting layer (A) comprises a propylene-based resin having a melting point of 140° C. or more.

21. The liquid crystal display apparatus as claimed in claim 18, wherein the inorganic fine powder and/or the organic filler included in surface-protecting layer (A) is present in an amount of 1 to 50% by weight, and the inorganic fine powder and/or the organic filler included in base layer (B) is present in an amount of 1 to 30% by weight.

22. The liquid crystal display apparatus as claimed in claim 18, wherein an average particle diameter of the inorganic fine powder is 0.1 to 5 μm, and an average dispersed particle diameter of the organic filler is 0.1 to 5 μm.

* * * * *